E. SACHS.
FREE WHEEL AND BACK PEDALING BRAKE MECHANISM.
APPLICATION FILED AUG. 24, 1910.
1,017,472.
Patented Feb. 13, 1912.
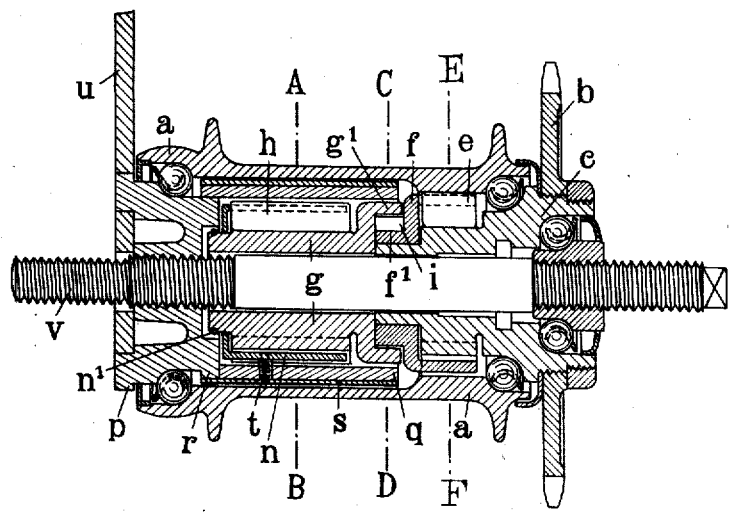
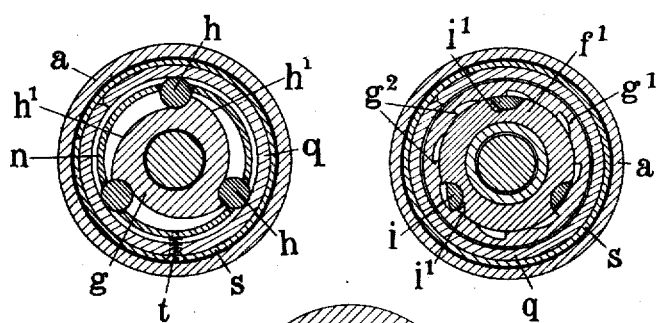
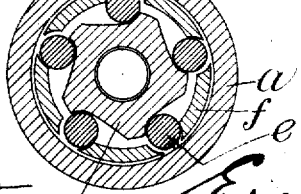

UNITED STATES PATENT OFFICE.

ERNST SACHS, OF SCHWEINFURT, GERMANY.

FREE-WHEEL AND BACK-PEDALING BRAKE MECHANISM.

1,017,472.  Specification of Letters Patent.   Patented Feb. 13, 1912.

Application filed August 24, 1910. Serial No. 578,776.

*To all whom it may concern:*

Be it known that I, ERNST SACHS, a subject of the King of Bavaria, residing at No. 24 Schultesstrasse, Schweinfurt, in Germany, have invented new and useful Improvements in Free-Wheel and Back-Pedaling Brake Mechanism, of which the following is a specification.

This invention relates to improvements in free wheel cycle hubs with back-pedaling brake mechanism in which either the driving coupling or the means expanding the brake-sleeve are composed of a set of friction-reducing members forced between two sleeve-shaped parts of the mechanism in their operative engagement and released in their inoperative position. Coupling of the parts is effected in the forward rotation of the mechanism, while pedaling in the reverse direction applies the brake by means of the brake actuating device.

The object of the invention is to so connect the driving element with the brake-actuating mechanism that the latter is at a rest during the forward movement of the cycle, thus avoiding undue friction. This object is attained by the insertion of a convenient coupling between the driver and the brake, which coupling is automatically engaged with the brake during rearward rotation of the driver.

A further object of the invention is the special construction and arrangement of the intermediate mechanism, by which the brake may be separated from the driving elements as a unitary construction the parts of which remain in their respective positions.

The mechanism is shown in the drawing which is to be considered as a part of this specification and in which—

Figure 1 is a longitudinal section of a cycle hub constructed in accordance with this invention; Fig. 2 is a cross section on the line A—B of Fig. 1, looking to the right. Fig. 3 is a cross-section on the line C—D of Fig. 1 looking to the left. Fig. 4 is a cross-section on the line E—F, looking to the left.

Like reference characters denote like parts throughout all figures of the drawing.

Upon the axle $v$ of the rear wheel of the cycle a sleeve $c$ is rotatably mounted in any well known manner. This sleeve, which is hereinafter called the driver, extends into the hub barrel $a$ of the rear wheel and is rigidly connected on its outer end with a power transmitting appliance, for instance, a sprocket wheel $b$, while between the hub shell $a$ and the said driver there is interposed a coupling mechanism comprising members, such as rollers $e$, located in pockets or depressions in the circumference of the driver $c$. The bottoms of the roller pockets are inclined faces gradually ascending outwardly in the direction of reverse rotation. This coupling of known type is brought to engagement with the adjacent inner cylindric face of the hub $a$, when the driver is being rotated forwardly, but is automatically disengaged when the driver is retarded or stopped in which case the rollers $e$ are moved to the deeper portion of the pockets and withheld from contact with the hub $a$ by a container or guide-ring $f$ in the recesses or perforations of which they are contained and spaced, as shown in Figs. 1 and 4, while stops at the front ends of the pockets limit the shifting of the rollers and lock them against the rear sides of the recesses in the container, as shown clearly in Fig. 4. From the opposite left hand side of the guide-ring $f$ projects a tubular extension $f^1$ having recesses $i^1$ in which pawls $i$ of any convenient, for example, semi-circular, shape are located and spring-loaded if desired. The said pawls engage with their free ends in internal ratchet teeth $g^2$ of a rim $g^1$ formed on a sleeve $g$ which is rotatable on the axle $v$. The number and position of the pawls $i$ and teeth $g^2$ may be disposed in any desired relation, for instance, only one pawl may be brought to engagement, as shown in Fig. 3, or all of them may be simultaneously brought into action. However, connection of the sleeve $g$ with the ring $f$ is effected by the said ratchet gear, only when the driver is relatively rotated backwardly, while forward movement automatically throws the pawls $i$ out of engagement with the ratchet teeth $g^2$, so that the sleeve $g$ is not operated. The said ratchet gear produces a slight friction which tends to check the rotation of the guide ring $f$, therewith controlling the movement of the rollers $e$ relatively to the driver.

The brake is constructed as follows. A convenient number of depressions or pockets $h^1$ are formed on the circumference of the sleeve $g$, which pockets gradually ascend outwardly in the direction of forward rotation, rollers *h* being placed therein opposite to, and encircled by a brake cylinder, composed of a sleeve *q* made of steel or other resilient material and a sleeve *s* of braking material, such as brass or the like, both sleeves being longitudinally slit and connected with one another in any suitable manner, whereby their relative rotation is prevented, although they are capable of free expansion. The said combined brake cylinder is attached, by means of a key *r* for example, to the left bearing cone *p* (Fig. 1) which can be immovably fixed to the cycle-frame by a lever *u*, as usual with free wheel hubs. The rollers *h* are guided and spaced through a retainer ring *n*, so that they are simultaneously caused to engage the sleeve. A split ring $n^1$ sprung into a circumferential groove of the sleeve *g* outside an inwardly directed flange of the retainer ring *n* is provided for the purpose of limiting the axial movement of the ring *n* with respect to the said sleeve *g*. In order to connect the brake cylinder to its expanding means, so as to form a unitary appliance which can be drawn from the axle, a screw *t* is provided in the cylinder, its point engaging a hole or slit of the retainer ring *n*. Where such connection is not desired, the screw may be dispensed with.

The free-wheel and brake-mechanism is operated as hereinafter described. When the rider rotates the treadles with the aim of propelling the cycle, the corresponding movement of the driver *c* presses the coupling roller *e* against the inner face of the hub *a* by the action of the inclined pockets, thereby coupling the driver and the hub, so that the power is transmitted to the rear wheel which is driven in the sense of forward movement of the cycle. The clutch *i* being inoperative in the forward rotation of the driver, no movement will be imparted to the sleeve *g* which will remain at rest. The stopping of the driver has the effect of automatically uncoupling the same from the hub as the latter will in its rotation move the rollers *e* to the deeper ends of the respective pockets, until they no more contact the hub. In this normal position the gear is immobilized by the checking effect of the ring $g^1$, for which reason the rear wheel is also capable of free rotation, when the cycle is pushed backward. Reverse motion of the driver causes the pawls *i* to engage the ratchet teeth $q^2$ of the sleeve *g* which is therefore rotated in the same direction, whereby the rollers *h* expand the brake-cylinder which is pressed against the inner face of the hub *a* and brakes the latter.

The piston-reducing members of the driving coupling and of the expanding appliance may be of any known shape, and the clutch between the said elements may also be of another convenient and known construction.

I, therefore, do not wish to be limited to the details illustrated for purpose of example, but

What I claim as my invention, and desire to secure by Letters Patent, is—

1. In a free wheel and brake mechanism for cycle hubs, the combination with a driver, of a wheel hub, a friction-reducing driving coupling between the said driver and the wheel hub, a brake expanding mechanism spaced from the driving coupling longitudinally of the hub, and a clutch provided between the said driving coupling and the brake-expanding mechanism, the said clutch being operative only in the reverse rotation.

2. In a free wheel and brake mechanism, the combination with a driver, of a wheel hub, a friction-reducing coupling capable of connecting the driver to the wheel hub, a friction-reducing appliance for expanding the brake spaced from the coupling longitudinally of the hub, and a clutch device disposed between the said coupling and said appliance, which clutch is only operative in the reverse rotation.

3. In a free wheel and brake mechanism, the combination of a driver, a hub, a friction-reducing mechanism adapted to operatively connect the driver and the hub, a braking member, a friction-reducing mechanism adapted to apply the braking member to the hub, the two friction-reducing mechanisms being each complete in itself and separate from the other, and a clutch device disposed between and operative in one direction of rotation to connect the said mechanisms.

4. In a free wheel and brake mechanism, the combination with a driving mechanism, of a brake-applying mechanism spaced from the driving mechanism axially, and a clutch arranged to transmit the power from the driving mechanism to the brake-applying mechanism, which clutch is operable only in the reverse rotation.

5. In a free wheel and brake mechanism, the combination with a driving mechanism having friction-reducing members and a retainer ring for the said members, of a brake applying friction-reducing mechanism, and a clutch separate from and disposed between the two mechanisms and adapted to connect said retainer ring to the brake-applying mechanism in the reverse rotation.

6. In a free wheel and brake mechanism, the combination with a hub, and a driving mechanism, of a brake applying mechanism, comprising a rotatable sleeve having inclined pockets and movable members located in said pockets and caused thereby to act against the hub, and a clutch adapted to connect the driving mechanism to the said rotatable sleeve in the reverse rotation.

7. In a free wheel and brake mechanism, the combination with a driver, of a wheel hub, a coupling having movable members adapted to connect the driver with the hub, a retainer ring for controlling the said members having a tubular projection, a clutch mounted upon the said projection, and a brake-applying device engaged by the said clutch in the reverse rotation.

8. In a free wheel and brake mechanism, the combination with a driving coupling, of a clutch connected with one end of the said coupling, a rotatable sleeve adapted to be engaged at one end by the said clutch in the reverse rotation and having inclined pockets, movable members located in said pockets and a non rotatable brake cylinder capable of being expanded by the said members with their movement in the sense of reverse rotation.

9. In a free wheel and brake mechanism, the combination with a rotatable sleeve adapted to be operatively engaged with the driving mechanism in the reverse motion, said sleeve having inclined pockets, of members located in the said pockets, so as to be forced outward with the rotation of the sleeve, a stationary brake cylinder encircling the said members, a retainer ring controlling the said members, means for securing the retainer ring on the said sleeve, and means positively connecting the retainer ring with the brake cylinder.

10. In a free wheel and brake mechanism, the combination with a driver, of a wheel hub, a driving coupling having movable members adapted to connect the driver and the hub, a retainer ring for controlling the said members, a clutch provided on the said retainer ring, a rotatable sleeve adapted to be connected to the driving coupling by the said clutch in the reverse rotation, said sleeve having inclined pockets, movable members located in said pockets, a stationary brake cylinder adapted to be expanded by the action of the inclined pockets and the movable members therein, and a retainer ring spacing the brake-actuating members.

11. In a free wheel and brake mechanism, the combination of a driving mechanism, a brake mechanism, a clutch arranged to connect said mechanisms, said clutch and said mechanisms being spaced longitudinally of a common axis, and a hub free of and inclosing said clutch and said mechanisms and arranged to be engaged by said mechanisms.

In testimony whereof I have signed my name to this specification in the presence of two subscribing witnesses.

ERNST SACHS.

Witnesses:
A. V. W. COTTER,
MATHILDE K. HELD.

It is hereby certified that in Letters Patent No. 1,017,472, granted February 13, 1912, upon the application of Ernst Sachs, of Schweinfurt, Germany, for an improvement in "Free-Wheel and Back-Pedaling Brake Mechanism," an error appears in the printed specification requiring correction as follows: Page 2, line 61, for the compound word "piston-reducing" read *friction-reducing;* and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*